(No Model.)
R. HOLBON.
GANG SHINGLE JOINTER.
No. 259,151. Patented June 6, 1882.
Fig. 1.
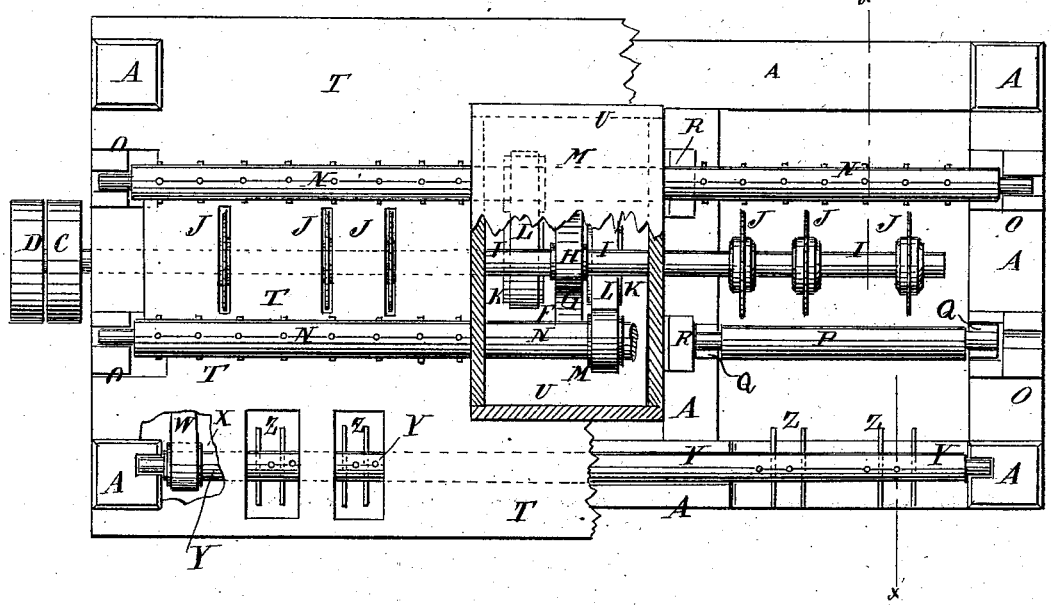
Fig. 2.
Fig. 3.    Fig. 4.
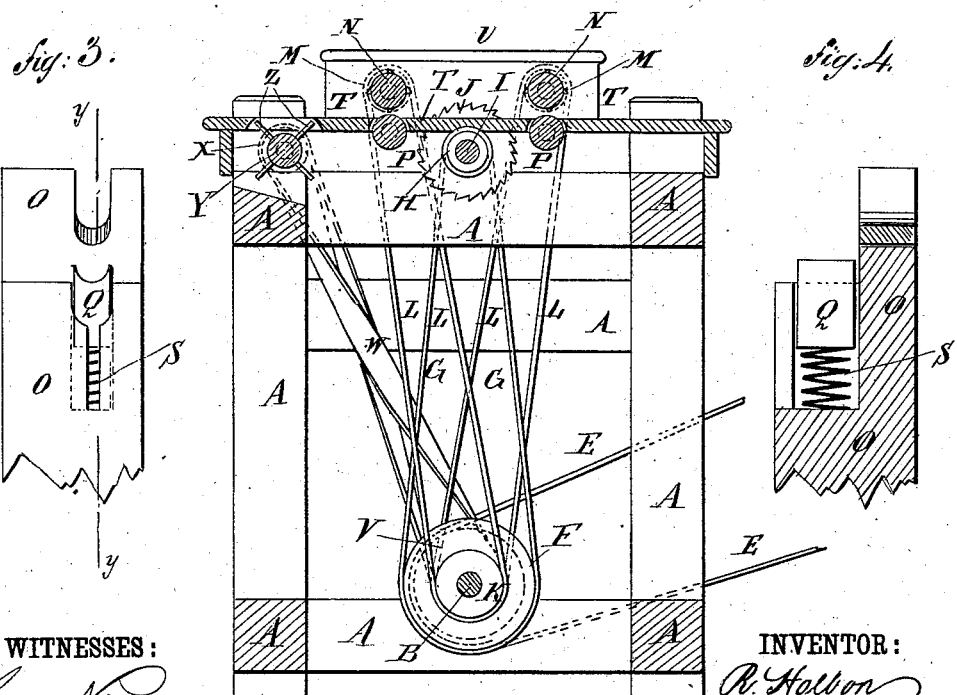
WITNESSES:
Chas. Nida
C. Sedgwick
INVENTOR:
R. Holbon
BY Munn &Co.
ATTORNEYS.

UNITED STATES PATENT OFFICE.

ROBERT HOLBON, OF ALPENA, MICHIGAN, ASSIGNOR TO HIMSELF AND FRANKLIN H. NORTHUP, OF SAME PLACE.

GANG SHINGLE-JOINTER.

SPECIFICATION forming part of Letters Patent No. 259,151, dated June 6, 1882.

Application filed March 9, 1882. (No model.)

*To all whom it may concern:*

Be it known that I, ROBERT HOLBON, of Alpena, in the county of Alpena and State of Michigan, have invented a new and useful Improvement in Gang Shingle-Jointers, of which the following is a full, clear, and exact description.

Reference is to be had to the accompanying drawings, forming a part of this specification, in which similar letters of reference indicate corresponding parts in all the figures.

Figure 1 is a plan view of my improved machine, parts being broken away. Fig. 2 is a sectional end elevation of the same, taken through the line $x\ x$, Fig. 1. Fig. 3 is an elevation of a part of the frame, showing the bearings for a lower and an upper roller. Fig. 4 is a sectional elevation of the same, taken through the line $y\ y$, Fig. 3.

The object of this invention is to provide machines for jointing shingles so constructed as to joint a number of shingles at a time.

The invention consists in a gang shingle-jointer constructed with a frame, a drive-shaft and its pulleys, a saw-mandrel and its pulley and saws, long roughened upper feed-rollers and their pulleys, short lower feed-rollers, and a rear roller having a pulley and radial arms; also, in the combination, with the frame, the table, and the saw-mandrel and saws, of long roughened upper feed-rollers and short spring-pressed lower feed-rollers, whereby the lumber is carried through the machine.

A represents the frame of the machine. B is the drive-shaft, the journals of which work in bearings attached to the lower part of the frame A. To the end of the shaft B is attached a fast pulley, C, and a loose pulley, D, to receive the driving-belt E.

To the center of the driving-shaft B is attached a large pulley, F, around which passes a belt, G, which also passes around a small pulley, H, attached to the saw-mandrel I.

The mandrel I revolves in bearings attached to or formed in the middle bars of the frame A, and upon it are placed the saws J, any desired number of which can be used, and which are kept in place by collars and set-screws, or other suitable means, so that the saws can be adjusted at any desired distance apart.

To the driving-shaft B, at the opposite sides of the pulley F, are attached pulleys K, around which pass belts L. The belts L also pass around pulleys M, attached to the upper feed-rollers, N, the journals of which revolve in bearings in the upper ends of the studs O, attached to the upper end bars of the frame A. The feed-rollers N are corrugated, provided with fine teeth, or otherwise roughened to cause them to take hold of the lumber to be sawed and carry it forward.

Beneath the end parts of each feed-roller N are placed short feed-rollers P, the journals of which revolve in bearings Q, placed in recesses in shoulders formed in studs O R, attached to bars of the frame A. The bearings Q rest upon spiral or other springs S, placed beneath them in the recesses in the studs O R, so that the lumber will be clamped between the feed-rollers P N with sufficient force to cause it to be fed forward steadily to the saws.

T is the table upon which the lumber is placed to be sawed, and through slots in which the upper parts of the lower feed-rollers, P, and the upper parts of the saws J project.

The middle parts of the mandrel I and feed-rollers N are covered with a box or casing, U, to protect the pulleys H M M and the belts G L L from the sawdust.

To the drive-shaft B is attached a pulley, V, around which passes a belt, W. The belt W is crossed and passes around a pulley, X, attached to a roller, Y, which revolves in bearings in the rear posts of the frame A. To the roller Y are attached radial arms Z, which are made of such a length that their outer ends will project through slots in the table T, so as to strike the shingles as they leave the rear feed-rollers and throw the said shingles off the table, separating them from the refuse.

I have described the machine as used for jointing shingles; but it can also be used for cutting lumber into strips for making window-sashes and for various other uses.

Having thus described my invention, I claim as new and desire to secure by Letters Patent—

1. A gang shingle-jointer constructed substantially as herein shown and described, and consisting of the frame A, the drive-shaft B and its pulleys, the saw-mandrel I, the saws J, the long feed-rollers N N and their pulleys, the short feed-rollers P, and rear roller, Y, having pulley X and radial arms Z, as set forth.

2. In a gang shingle-jointer, the combination, with the frame A, the table T, and the saw-mandrel I and saws J, of the long roughened upper feed-rollers, N, and the short spring-pressed lower feed-rollers, P, substantially as herein shown and described, whereby the lumber is carried through the machine, as set forth.

ROBERT HOLBON.

Witnesses:
CORNELIUS O'BRIEN,
MICHAEL O'BRIEN.